Nov. 1, 1966

G. D. JONES ET AL 3,282,160

COLOR REVERSIBLE ELECTROCHEMICAL LIGHT
FILTER UTILIZING ELECTROLYTIC SOLUTION
Filed Jan. 7, 1963

INVENTORS.
Giffin D. Jones
Ralph E. Friedrich

BY

Griswold & Burdick
ATTORNEYS

United States Patent Office 3,282,160
Patented Nov. 1, 1966

3,282,160
COLOR REVERSIBLE ELECTROCHEMICAL LIGHT FILTER UTILIZING ELECTROLYTIC SOLUTION
Giffin D. Jones and Ralph E. Friedrich, Midland, Mich., assignors to The Dow Chemical Company, Midland, Mich., a corporation of Delaware
Filed Jan. 7, 1963, Ser. No. 249,862
3 Claims. (Cl. 88—107)

This invention relates to an improved electrochemical, substantially transparent, light filter the color of which may be reversibly altered upon the appropriate application of electric current.

Tinted or colored glass has found wide acceptance and applicability. It is useful in situations where direct sun or other light is harmful or undesirable. In such situations the tinted or colored glass may filter out a portion of the light or simply reduce its intensity. Usually, the incident light is undesirably intense only during certain periods of the day. In this situation, it is desirable that the glass be clear or nearly clear at least a part of the time. Eastern exposure windows, for example, would desirably be tinted in the morning and clear during the afternoon. For western exposure windows, of course, the reverse could be true.

Numerous attempts have been made to provide light filters of variable absorption. One such attempt is disclosed in U.S. Patent 2,710,274. That patent discloses a method wherein a substantially transparent sandwich of two outside layers of glass and a middle layer of a material whose transparency changes with luminous intensity and/or temperature. These filters have the apparent disavadntage of being dependent on luminous intensity and/or temperature and, to that extent, are not subject to positive control of light transmission.

Other proposed methods of providing a variable intensity light filter include (as suggested in U.S. Patent 2,953,819) the orientation of small particles contained in a liquid by means of an electric field, thereby altering the transmission of light through the liquid. A method is suggested in British Patent 328,017 wherein a clear solution is caused to develop a color as long as electric current is passed therethrough, the color disappearing and the solution clarifying immediately upon termination of the current. Similarly, in U.S. Patent 2,632,045, an electrochemical color filter is suggested in which the intensity of the color is proportional to the voltage applied thereto. As the potential is decreased, the solution in the filter reverts to its original (usually clear) state.

None of the above method succeed in a color change which will remain as long as desired without the continuous application of current to the solution in the filter.

We have discovered an electrochemical light filter, the color of which may be reversibly altered and, once formed, will remain over a substantial period of time without further application of electric current thereto.

A better understanding of the present invention together with its attendant objects and advantages will be facilitated by the following specification when taken in conjunction with the accompanying drawings in which.

Figure 1:
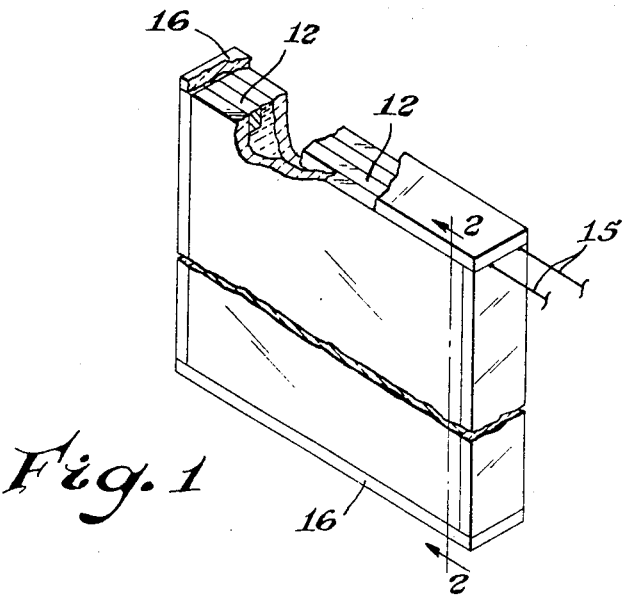
FIGURE 1 is an isometric view partially in section of one embodiment of the filter of the present invention.
Figure 4:
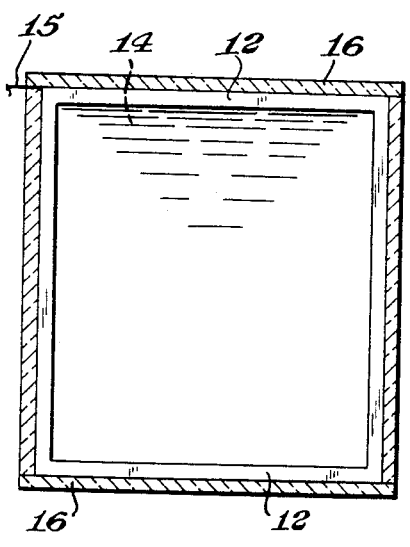
FIGURE 4 is a sectional view of the filter of the present invention which illustrates in more detail the minor electrode.
Figure 2:
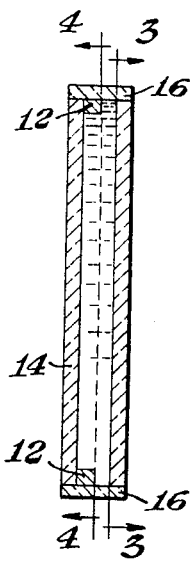
FIGURE 2 is a sectioned plan view of the filter of the present invention.
Figure 3:
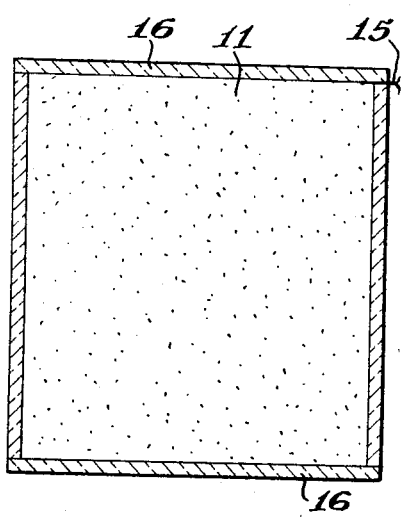
FIGURE 3 is a sectional view of the filter of the present invention which illustrates in more detail the tarnsparent gross electrode.

In the embodiment illustrated in the drawings, one major internal surface 11 of the filter is treated so as to make a major portion of that side electrically conductive without destroying transparency. A relatively small, inert conductive electrode surface 12 is provided within the filter. In the embodiment illustrated, the electrode surface 12 is in the form of a peripheral strip around the outer edge of major internal surface 14 of the filter. Other configurations are, of course, possible and may also be desirable. Each electrode is provided with means, such as wires 15, to connect an external source of direct current. Sealing means 16 is generally employed to protect the solution from contact with air and to prevent spillage in handling and use.

The filter may be constructed of glass, suitable plastics or any other substantially transparent material which is impervious to the aqueous solution to be retained within the body of the filter. Desirably the transparent material has characteristics which will permit its use as a structural member as, for example, in interior or exterior window glass fixtures.

Ordinarily, the transparent gross electrode will preferably cover the entire surface of one major internal surface of the filter. Suitable materials for forming this transparent electrode are stannic or indium oxide, a metallized coating or a metallic screen of particles sufficiently small that substantial transparency is maintained. The minor, preferably inert, electrode need not be transparent. Silver, platinum, chromium, nickel, tungsten, calomel, or wires coated with these materials or the like may be used, depending on the solution to be contained in the article.

Appropriate aqueous, light transmitting solutions for use in the filter of the present invention are those containing soluble complexes of iron ion. Other ions permissible in the aqueous solutions useful in the filter of the present invention are those which do not form precipitates with either the complexed or uncomplexed iron ions or other ions present, and are not readily oxidized or reduced. Examples of other ions permissible in the aqueous solutions are: sodium, lithium, potassium, ammonium, hydrogen, magnesium, acetate, chloride, sulfate, nitrate, and the like which exhibit the requisite characteristics outlined above.

Iron content of the solutions of the present invention will usually range from about 10 parts per million to the solubility limit in aqueous acid. Appropriate materials for the complexing of iron ions in accordance with the present invention are cyanides, thiocyanates, and phenates such as phenol, hydroquinone, silicylaldehyde, 8-hydroxy quinoline, and the like.

When cyanide is used as the complexing agent, an amount of cyanide of from about 10 to about 90 percent of the stoichiometric amount required to complex all the iron present in solution is desired, with an amount of cyanide of from about 30 to about 70 percent of the stoichiometric amount being preferred. Complexed iron ion in an amount of at least 10 parts per million is usually required to give visually noticeable color change in accordance with the present invention.

When thiocyanates or the phenates are used as complexing agents, they should be employed in an amount sufficient to complex all ferric ion present in the solution, usually 10 parts per million or more. Excess amounts of these complexing agents are usually employed so as to insure complexing of all ferric ion.

In order that uncomplexed iron ion remain soluble in both the +2 and +3 valence states, it is necessary to have a solution pH less than 3. Higher solution pH will usually result in the formation of undesirable irreversible precipitates.

Voltage applied between the electrodes should be sufficient to cause current flow, but should be below the gassing limit of the particular cell used. The electrode-electrolyte voltage should be below the accepted decomposition potential (about 2.2 volts). Total voltage applied to the electrodes will, of course, take into account the conductivity of the electrolyte solution and the cell geometry. For instance, if the voltage drop across the electrolyte in the particular cell to be used were one volt, and three volts were applied between electrodes, the electrode-electrolyte voltage would be two volts and thus below the 2.2 volt gassing limit.

In some instances it may be desirable to mix into the solution a freezing point depressant. Further, in some applications the addition of a gelling agent may be desirable, mainly to prevent leakage. None of these are essential. The use of these additives such as an anti-freeze or a gelling agent, should be considered in light of the particular metal-containing ions contained in the solution. Some anti-freezes or gelling agents may react with the ions in solution and would thus be undesirable. Tertiary alcohols, however, and particularly tertiary-butyl alcohol, as well as the known inorganic freezing point depressants, are generally useful as anti-freeze additives in the present invention.

A wide variety of gelling agents such as sulfonated polyvinyl aromatics, polymers of sulfonated aromatic monomers, polyvinyltrimethylammonium chloride, hydrolyzed polyisopropenyl acetate, or the like may also be employed, if desired.

Maximum color stability may be obtained by protecting the solution from contact with air. When the solution is so-protected, color formed by the passage of current through the solution will usually remain for at least several hours or until a current is passed through the solution in the reverse direction.

The present invention may be more readily understood in light of the following example which is set forth to illustrate, and is not to be construed to limit, this invention.

*Example*

A glass cell was constructed substantially as hereinbefore described and having a one inch square transparent gross electrode of glass coated with tin oxide and a minor electrode of silver.

An aqueous solution was prepared by mixing 50 milliliters of one percent ferric chloride ($FeCl_3$) and one milliliter of 0.1 percent potassium ferricyanide

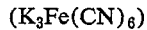

This solution was adjusted to a pH of 2 with hydrochloric acid and used to fill the cell previously constructed. The cell was then sealed to prevent leakage and contact of the solution with air. With the conducting glass electrode cathodic, a current of about 15 milliamperes turned the solution from clear to blue in about one half hour.

After a period of several hours with no current flow through the solution, the blue color remained with no observable loss in intensity. Reversal of polarity of the electrodes and again causing current to flow cleared the solution in about three hours.

Under substantially the same conditions outlined in the above example, ammonium thiocyanate, phenol, hydroquinone, salicylaldehyde, 8-hydroxyquinoline and the like may be used as the complexing agent with an iron containing solution in place of cyanide with substantially similar results. The color change, instead of being from clear to blue, will be from light pink to deep red when the cell polarity is such that the gross electrode is cathodic. Reversal or polarity will result in the reappearance of the original light pink color. Both color forms are usually stable.

Various modifications may be made in the present invention and it is to be understood that we limit ourselves only as defined in the appended claims.

We claim:

1. In an electrochemical light filter having a transparent gross electrode, a minor electrode in spaced relation to the gross electrode and which is spaced and positioned to allow the passage of light, a light transmitting electrolyte occupying the space between said electrodes, an electrical power source and means for reversibly applying such electrical power to the electrodes, the improvement which comprises providing as said electrolyte an aqueous solution having a maximum pH of 3 and containing therein a coloring amount of complexed iron ion stable in aqueous solution in the +2 and +3 valance states whereby the color of the aqueous solution is altered by sequentially applying pulses of electrical power of opposite polarity.

2. The electrochemical light filter of claim 1 wherein the concentration of the iron ion is from about 10 parts per million to the solubility limit thereof in the aqueous solution.

3. The electrochemical light filter of claim 1 wherein iron is complexed by cyanide.

References Cited by the Examiner

UNITED STATES PATENTS

| 2,632,045 | 3/1953 | Sziklai | 88—107 X |
| 2,710,274 | 6/1955 | Kuehl. | |
| 2,953,819 | 9/1960 | Holoubek et al. | 106—291 X |

FOREIGN PATENTS 328,017 4/1930 Great Britain.

DAVID H. RUBIN, *Primary Examiner.*

J. G. BOLTEN, *Assistant Examiner.*